Sept. 10, 1963 R. D. RUMSEY ETAL 3,103,281
ROTARY ACTUATOR UNIT MOUNT FOR BOOMS AND THE LIKE
Filed Feb. 3, 1961 2 Sheets-Sheet 1
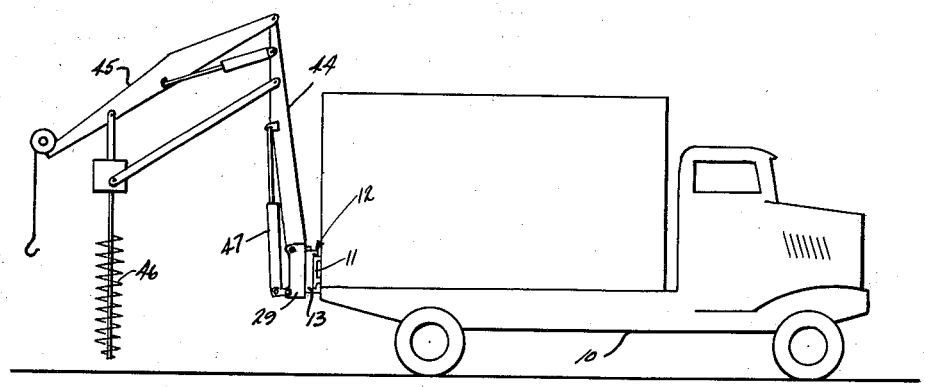
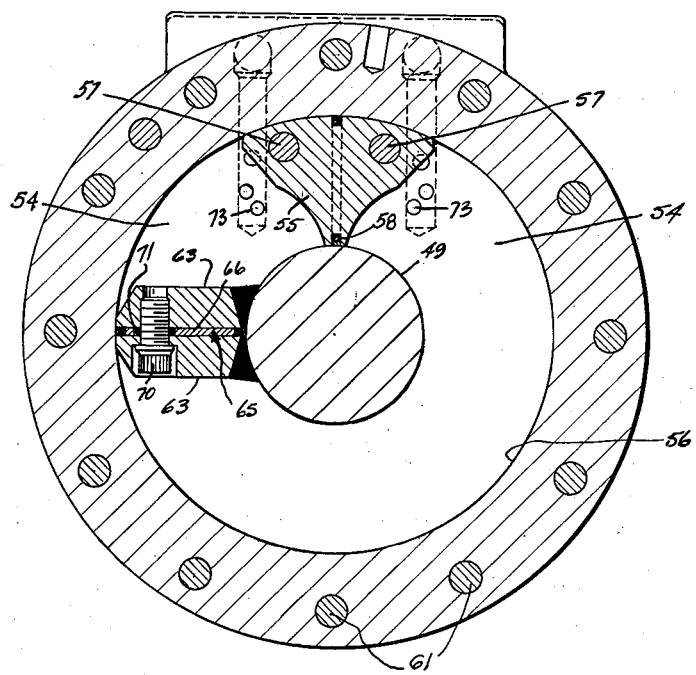
INVENTOR.
Rollin D. Rumsey
Gervase M. Magrum
BY
ATTORNEYS

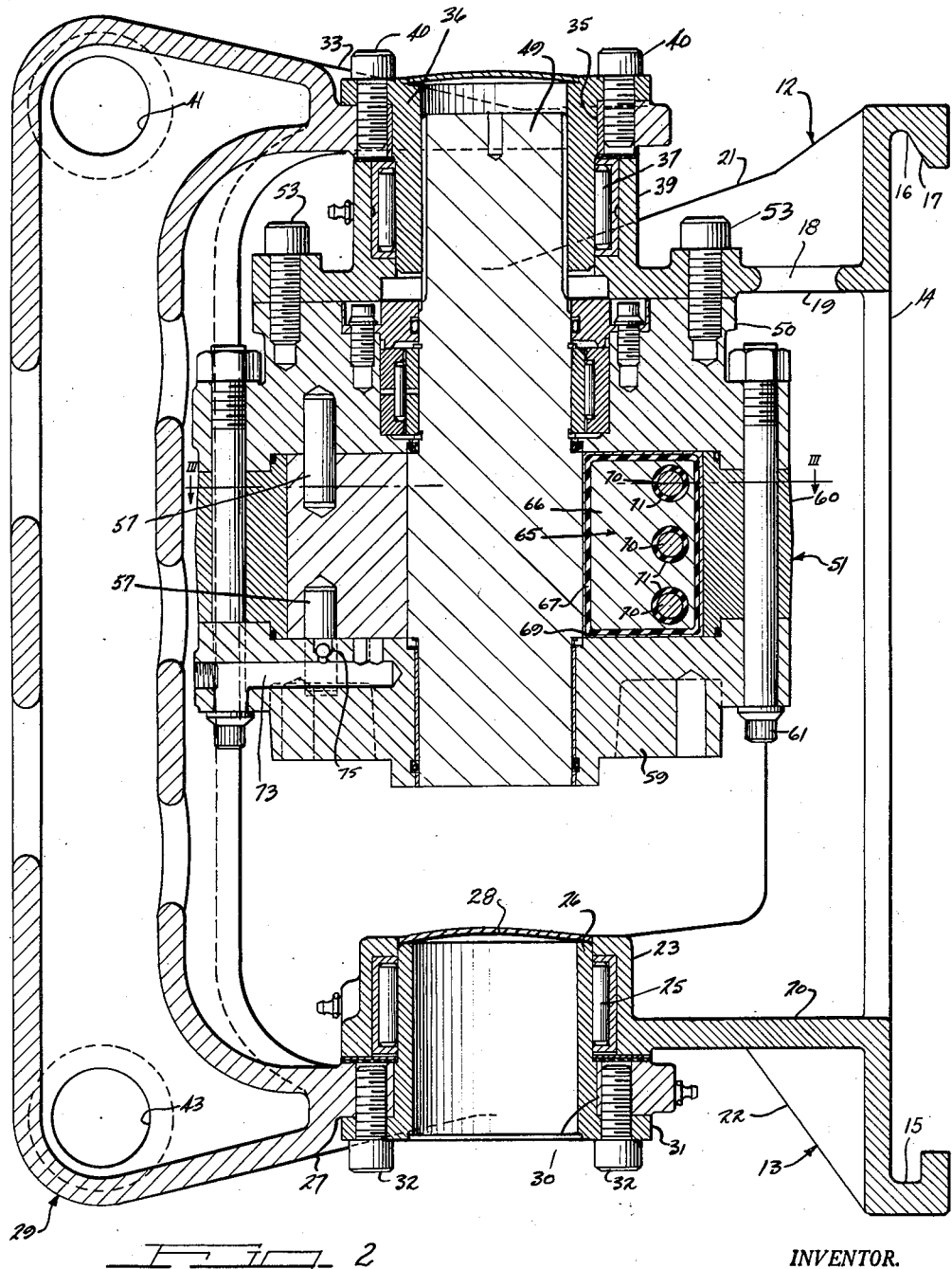

United States Patent Office 3,103,281
Patented Sept. 10, 1963

3,103,281
ROTARY ACTUATOR UNIT MOUNT FOR BOOMS AND THE LIKE
Rollin Douglas Rumsey, Buffalo, and Gervase M. Magrum, Williamsville, N.Y., assignors to Houdaille Industries, Inc., Buffalo, N.Y., a corporation of Michigan
Filed Feb. 3, 1961, Ser. No. 86,904
2 Claims. (Cl. 212—66)

This invention relates to improvements in mounts for the booms for derricks, backhoes and the like and more particularly relates to a simple and improved powered mounting unit for detachable mounting on a tractor or other vehicle.

A principal object of the present invention is to provide a simple, improved and compact unitary mounting for a boom of a derrick backhoe and the like, in which a rotary actuator is an integral part of the mounting.

Another object of the invention is to provide a unitary mounting which may be detachably mounted on a truck, tractor or a like vehicle, having a rotary actuator as an integrated part thereof and swinging the mounting from side to side and holding the mounting in various selected positions of adjustment.

A further object of the invention is to provide an improved mounting for the booms for derricks and the like, including an improved actuating system therefor capable of uniform torque throughout 270° travel, cushioned at the end of travel of the boom, and of a simplified and rugged construction.

A still further object of the invention is to provide a compact unitary mount for the booms for derricks, backhoes and the like, employing a rotary actuator integrated with the mount to drive the boom from side to side and hold the boom in selected horizontal positions of adjustment, and avoiding the use of chains, cables, racks, gears and the like heretofore required for the boom mounting.

These and other objects of the invention will appear from time to time as the following specification proceeds and with reference to the accompanying drawings wherein:

FIGURE 1 is a diagrammatic view of a utility truck, showing the boom mount of our invention mounted on the back of the truck and forming the mounting for a derrick and auger;

FIGURE 2 is a vertical sectional view taken through the mount shown in FIGURE 1 with the boom and actuating cylinder therefor removed and showing the actuator in composite section; and FIGURE 3 is a horizontal sectional view taken through the actuator substantially along line III—III of FIGURE 2.

In the embodiment of the invention illustrated in the drawings, we have shown in FIGURE 1 a utility truck 10 having a vertical support plate 11 extending across the rear end thereof, forming a mounting rail or bracket for a unitary boom mount 12. The boom mount 12 includes a bracket 13 having a vertically extending rear plate portion 14 having an upwardly opening gibbed portion 15 at the lower end thereof, and extending rearwardly of said plate portion and having a downwardly opening gibbed portion 16 facing the gibbed portion 15, and having an inclined face 17 facing the plate portion 14, and forming with the rear face of the plate portion 14, a wedge shaped groove engageable with the upper edge of the mounting plate 11, as the upwardly opening gibbed portion 15 is in engagement with the lower edge thereof. The inclined face 17 allows the weight of the derrick boom, carried by the mount to form a tight fit on the upper edge of the mounting plate and prevents rattle and backlash.

The plate portion 14 has an arm 19 extending rearwardly from the upper end portion thereof and has a parallel downwardly spaced arm 20 extending rearwardly from the lower end portion thereof. The arms 19 and 20 are reenforced by gussets 21 and 22 respectively. The arm 19 has an open portion 18 to accommodate dirt to fall therethrough, and to thereby avoid the trapping of dirt on said arm. The arm 20 may have similar open portions therein (not shown).

The arm 20 has a hollow boss 23 at the outer end portion thereof and extending upwardly therefrom toward the arm 19. The hollow boss 23 is shown as having a bearing 25 carried therein forming a bearing for a sleeve 26 extending inwardly from the forward end portion of a lower arm 27 of a pivoted frame 29. A cap 28 closes the top portion of the hollow boss 23, to seal the bearing 25 from dirt.

As shown in FIGURE 2, the arm 27 has a circular opening 30 therein through which extends the sleeve 26. The sleeve 26 has a flanged lower end portion 31 extending outwardly of the opening 30 and secured to the arm 27 as by machine screws 32, extending through the flanged portion 31 and threaded within the arm 27.

The pivoted boom support 29 also has an upper arm 33 extending in the same direction as the lower arm 27 and generally parallel thereto, having an opening 35 therein having a flanged sleeve 36 extending therethrough and journalled in the arm 19 in a bearing 37 mounted in an upwardly extending hollow boss portion 39 of the arm 19. Machine screws 40 extending through the flanged portion of the flanged sleeve 36 and threaded within the arm 33 outwardly of the opening 35, are provided to mount the flanged sleeve 36 to the arm 35 and to retain said arms for pivotal movement about the axes of the coaxial bearings 37 and 25. The pivoted support frame 29 is of a generally C-shaped form in side elevation and is shown in FIGURE 2 as being hollow and as having mounting holes 41 and 43 at the respective upper and lower end portions thereof and at opposite sides thereof. The mounting hole 41 as shown in FIGURE 1, forms a pivotal mounting for a boom 44, for a derrick 45 and auger 46. The mounting holes 43 form a pivotal mounting for a hydraulic cylinder and piston unit 47 pivotally connected with the boom 44 for raising and lowering said boom about the axis of the mounting holes 41.

Referring now in particular to the integrated rotary actuator for swinging the pivoted frame 29 and boom 44 laterally, said actuator includes a rotary wing shaft 49 suitably journalled in a housing 51 for the rotary actuator and extending upwardly from an end plate 50 of the housing 51. The wing shaft 49 is splined or otherwise secured to the flanged sleeve 36 for rotatably driving said sleeve and the pivoted frame 29. The end plate 50 of the housing 51 is shown in FIGURE 2 as abutting the undersurface of the arm 19 and as being secured thereto as by machine screws 53. The rotary actuator 51 is thus contained in the space between the arms 19 and 20 and within the inner margins of the pivoted support frame 29 and forms an integrated part of the bracket 13.

The rotary actuator, as shown in FIGURES 2 and 3, includes actuator chambers 54 of increasing and decreasing volume on opposite sides of an abutment 55, extending inwardly of an internal cylindrical wall 56 of the actuator housing and a sliding vane or wing in the form of two spaced wing parts 63 extending generally radially of the wing shaft 49. The abutment 55 is mounted within the actuator housing, in fixed relation with respect thereto, as by dowels 57 mounted in said fixed abutment and extending in the end housing member 50 and in an opposite end housing member 59. A sealing member 58, similar to the abutment sealing members shown and described in an application Serial No. 116,372 filed by Rollin D. Rumsey on June 12, 1961 is provided to seal the abutment 55 to the shaft 49. The end housing members 50 and 59 are in turn secured to opposite faces of an intermediate spacer or annular housing member 60, as by through bolts 61.

The wing parts 63 are shown as being welded or otherwise secured to the shaft 49. The space between the wing parts 63 forms a slot for a seal 65. The seal 65, as shown in FIGURES 2 and 3, includes a generally rectangular spacer 66 having an O-ring 67 stretched thereabout. A plastic seal 69 made from a sealing material, such as Teflon, nylon or any other similar material, extends about the O-ring 67 and forms a continuous seal engaging the periphery of the wing shaft 49, the inner cylindrical wall 56 of the casing 51 and the inner faces of the end housing members 50 and 59.

The seal 65 including the spacer 66, O-ring 67 and plastic outer seal 69 is inserted in the slot formed by the space between the wing parts 63. Machine screws 70 extend through the two wing parts 63 and spacer 66 and are threaded in one wing part and serve to strengthen the wing parts and distribute the load between the two wing parts as pressure acts on one wing part. The machine screws 70 are sealed to the spacer 66 by thread seals 71, which may be rectangular in cross-section.

Inlets 73 lead into the end closure 59 of the housing 51 and enter the working chamber 54 on opposite sides of the abutment 55, through the wall of the end housing member 59. A check valve chamber 75 leads from each inlet 73 toward the outer end portion of the actuator chamber 54 and is partially covered by the wing 55. The wing 55 thus retains the check valve to said check valve chamber. Said check valve chamber serves to cushion movement of the actuator toward the ends of its strokes as the passageways leading through the outlet are enclosed by a vane 63, it being understood that one inlet 73 serves to admit fluid under pressure to one actuator chamber 54, while the other inlet serves to release fluid under pressure from the opposite actuator chamber 54.

It may be seen from the foregoing that the boom mount unit of the present invention, with the integrated rotary actuator, provides a simple and efficient unit which makes it possible to eliminate all chains, cables, racks, gears and the like, heretofore required for such units, and provides a simple assembly which may readily be mounted on a tractor, truck or the like, for supporting a derrick or backhoe boom and actuator therefor, and swinging the boom from side to side by power.

It may further be seen that the actuator is so mounted on the unit to in effect be an integral part of the unit and is of an extremely compact size and is capable of swinging the boom or other device mounted on the unit through substantially 270°.

It should here be understood that while in the present form of the invention the boom mount unit is shown with the actuator secured to the upper arm 19, that it may be mounted on the lower arm as well and that the unit may be inverted without affecting the operation thereof.

While we have herein shown and described one form in which our invention may be embodied, it may be understood that various modifications and variations in the invention may be attained without departing from the spirit and scope of the novel concepts of the invention, as defined by the claims appended hereto.

We claim as our invention:

1. In a rotary actuator and boom mounting of the class described, a bracket having a plate portion having fastening means thereon for mounting on a vehicle and having two vertically spaced arms extending from said plate portion in parallel spaced relation with respect to each other, a frame forming a mounting for boom means and actuating means therefor, said frame being generally C-shaped in form and having parallel spaced arms extending below and above said arms on said bracket, said arms on said bracket each having hollow bearing support bosses adjacent the outer ends thereof, sleeve means secured to said arms of said support frame and extending inwardly therefrom and journalled in said bearing support bosses and mounting said frame on said bracket, and actuator means for said frame mounted on said bracket within the limits of said bracket and frame and having a shaft having driving engagement with one of said sleeve means.

2. An actuator and boom mounting unit of the class described, adapted for mounting on a vehicle and having a mounting plate and a pair of vertically spaced arms extending therefrom having hollow bosses formed integrally therewith at the outer ends thereof and arranged coaxially of each other, a boom support frame of a generally C-shaped form having arms extending along said hollow bosses, the uppermost arm extending along the top of the upper hollow boss and the lowermost arm extending along the bottom of the lower hollow boss, bearing means carried by said hollow bosses and sleeve means journalled in said bearing means and rigidly secured to said arms of said boom support frame, a rotary actuator abutting the inside of one of said vertically spaced arms extending from said mounting plate, means retaining said rotary actuator to said arm extending from said mounting plate, in the space between said arms, and holding said rotary actuator from pivotal movement with respect to said arms extending from said mounting plate, said rotary actuator having an actuator shaft coaxial with and splined to the sleeve means journalled in the hollow boss on the arm to which said rotary actuator is secured, for pivotally moving said boom support frame about the axes of said hollow bosses upon the admission of fluid under pressure to said actuator.

References Cited in the file of this patent

UNITED STATES PATENTS

| | | |
|---|---|---|
| 2,489,326 | Rockstrom et al. | Nov. 29, 1949 |
| 2,540,903 | Moushey et al. | Feb. 6, 1951 |
| 2,798,462 | Ludwig et al. | July 9, 1957 |
| 2,903,142 | Wills | Sept. 8, 1959 |
| 2,978,116 | Wells et al. | Apr. 4, 1961 |
| 2,994,446 | Van Auwelaer et al. | Aug. 1, 1961 |